H. ANDERSON & J. F. HOUGHTON.

Broom-Machine.

No. 6,275. Reissued Feb. 9, 1875.

WITNESSES:

D. A. Rohl

Elbridge F. Arnold

INVENTORS:

Henry Anderson

James F. Houghton,

By their Atty.

Lionel Varicas

THE GRAPHIC CO. PHOTO-LITH. 39 & 41 PARK PLACE, N.Y.

UNITED STATES PATENT OFFICE.

HENRY ANDERSON, OF SAN FRANCISCO, AND JAMES F. HOUGHTON, OF SACRAMENTO, CALIFORNIA, ASSIGNORS, BY MESNE ASSIGNMENTS, TO HENRY ANDERSON AND JOHN B. ROBINSON.

IMPROVEMENT IN BROOM-MACHINES.

Specification forming part of Letters Patent No. 150,669, dated May 12, 1874; reissue No. 6,275, dated February 9, 1875; application filed August 31, 1874.

*To all whom it may concern:*

Be it known that we, HENRY ANDERSON, of the city and county of San Francisco, State of California, and JAMES F. HOUGHTON, of the city of Sacramento, State of California, have invented certain Improvements in Broom-Machines, of which the following is a specification:

Our invention relates to the attachment of a taper form to a broom-machine, in such manner that this form shall keep in position different sizes of metallic or other sockets, whereon broom-corn may be spread; the object of our invention being to have a form that can be fixed to the holders of broom-machines, so as to admit of the adjustment of various sizes and shapes of our improved broom-handle sockets, whereon broom-corn may be secured in the same manner as on ordinary broom-handles, the form with fixed and adjusted socket taking the place of the wooden handle usually employed in the manufacture of such brooms.

Figure 1:
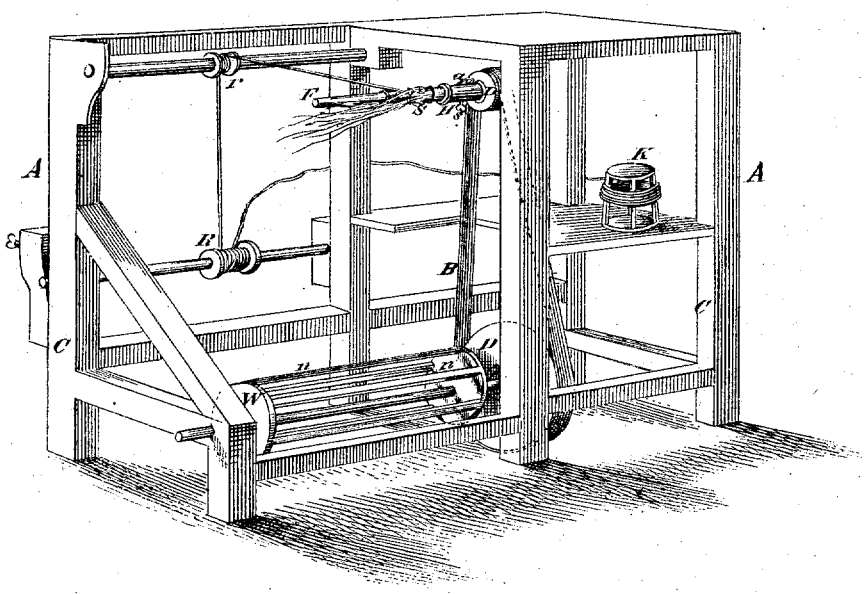
Figure 3:
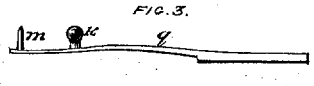
Figure 4:
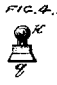
Figure 2:
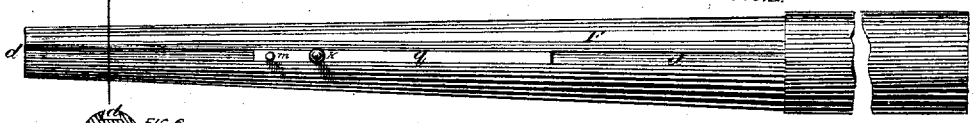
Figure 6:
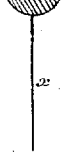
Figure 5:
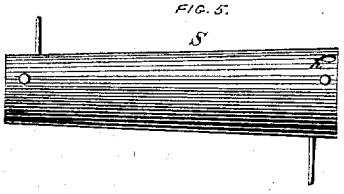

Figure 1 is a perspective view of a broom-machine with the form thereto attached embodying our invention. Fig. 2 is a plan of the form embodying our invention for the adjustment of sockets thereto in the manufacture of detachable brooms. Figs. 3 and 4 represent a side and end view, respectively, of a sliding spring to the form shown in Fig. 2, for securing detachable sockets fitted thereto. Fig. 5 is a side view of a metallic socket, made tapering for adjustment to a correspondingly-tapered broom-handle, and on which broom-corn is spread when it has been secured in position to the form or mandrel represented in Fig. 2. Fig. 6 is a transverse section of the form represented in Fig. 2 through the line *x x*.

A A is a broom-machine, which is constructed in the usual manner adopted in the manufacture of such machines, and consists of a frame, C C, treadle-wheel, W, connected to a large drum, D, so as to engage a smaller drum, D′, by means of a belt, B. To this drum D′ is fitted a holder, H, into which ordinary broom-handles are secured by the adjustment of the thumb-screw *s* on the spring *a*. A roll of wire is wound round a wooden spool, K, so as to supply a reel, R, and pass over in a single thread a smaller reel, *r*, convenient to the manufacturer for winding round such broom-corn as may be spread on the wooden handle supposed to be fixed in the holder H, the treadle-wheel W serving to turn such handle round by the pressure of the foot on the rungs *n n*, for the proper laying and securing of this corn. F is the form embodying our invention, which is fitted to the holder H in place of the wooden broom-handle, so that a socket, S, may be slipped over it, and fastened thereto for receiving layers of broom-corn in the usual manner. In order to effect this the form F is constructed so as to have about one foot of its length straight for a bearing within the holder H, and the remaining foot of its length tapering, say, from one and a half inch to three-fourths of an inch, to suit the various sizes and shapes of different sockets. The form F is tapered, as represented in Fig. 2, and is provided with a beveled groove, *d*, cut either its entire length or for the taper part only. Into this groove *d* a long spring, *q*, is fitted, also beveled for about a third of its length, so as to fit into and slide freely along it, its remaining portion being left free, and allowed to spring from the groove. Near the thin end of this spring *q* a pin, *m*, is provided, so that on pressing a socket, such as S, over the spring *q* this pin *m* may be adjusted through the hole *h* always arranged in these sockets for this especial purpose. At a little distance away from the pin *m* a knob, *k*, is fixed, which is pressed down into the groove *d* when it is required to adjust a socket, such as S, by means of this pin, and when a socket is thus secured, the knob *k* being left uncovered, can be grasped by the finger and thumb, so that the spring *q* may be slid along this groove *d*, carrying the socket along with it till such time as it shall have arrived at the portion of the taper form F where the socket may fit and be in the most convenient position for receiving its broom-corn.

The mandrel F forms a rigid backing for the nails or rivets fitted to the sockets, and to be riveted down over the binding-wire of the broom-corn.

We disclaim the drums D D′, treadle-wheel W with belt B, holder H, spring *a*, and screw *s*, and reels R *r* of the broom-machine A A, as we are aware that these are not new; but

We claim as our invention—

The grooved mandrel F *d*, provided with the spring *q*, having an outwardly-projecting pin, *m*, and knob *k*, substantially as and for the purposes herein specified.

HENRY ANDERSON.
JAMES F. HOUGHTON.

Witnesses:
ALFRED C. CRANE,
LIONEL VARICAS.